(12) United States Patent
Takeuchi et al.

(10) Patent No.: US 8,801,070 B2
(45) Date of Patent: Aug. 12, 2014

(54) GARNISH AND MOUNTING STRUCTURE

(75) Inventors: Katsuhiko Takeuchi, Aichi-ken (JP); Hiroaki Yamasaki, Toyota (JP); Yasumitsu Shimizu, Okazaki (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 13/701,032

(22) PCT Filed: May 26, 2011

(86) PCT No.: PCT/JP2011/062110
§ 371 (c)(1),
(2), (4) Date: Feb. 5, 2013

(87) PCT Pub. No.: WO2011/152279
PCT Pub. Date: Dec. 8, 2011

(65) Prior Publication Data
US 2013/0127196 A1   May 23, 2013

(30) Foreign Application Priority Data

Jun. 4, 2010 (JP) ................................. 2010-129309

(51) Int. Cl.
*B60J 9/00* (2006.01)
*B60R 21/213* (2011.01)
*B60R 21/232* (2011.01)

(52) U.S. Cl.
CPC .................................. *B60R 21/213* (2013.01); *B60R 21/232* (2013.01)
USPC ....................................................... 296/1.08

(58) Field of Classification Search
CPC  B60R 21/213; B60R 11/232; B60R 13/0206; B60R 13/025; B60R 13/04; B60J 10/0662; B60J 10/0051; B62D 25/04

USPC ........................ 296/1.08, 187.05, 146.9, 39.1; 280/728.3, 751, 728.2, 730.2; 49/490.1, 502

See application file for complete search history.

(56) References Cited

U.S. PATENT DOCUMENTS 5,419,606 A * 5/1995 Hull et al. .................. 296/146.7
6,487,820 B1 * 12/2002 Nakajima et al. ............ 49/490.1
(Continued)

FOREIGN PATENT DOCUMENTS

JP   1-77111    5/1989
JP   8-282284   10/1996
(Continued)

OTHER PUBLICATIONS

Translation of International Preliminary Search Report on Patentability and Written Opinion dated Jan. 8, 2013, from International Searching Authority in counterpart PCT Application No. PCT/JP2011/062110 (5 pages).

*Primary Examiner* — Kiran B Patel
(74) *Attorney, Agent, or Firm* — Finnegan, Henderson, Farabow, Garrett & Dunner LLP

(57) ABSTRACT

Disclosed is a resin garnish attached to a door frame forming the window frame of a vehicle door. The door frame is provided with a frame unit including an attachment unit having an insertion hole, and a weatherstrip fastened to said frame unit using a clip. The clip is inserted through the weatherstrip unit and the insertion hole to fasten the weatherstrip to the frame unit by engaging with the frame unit. The garnish is provided with a garnish body forming a design surface facing out of the vehicle, and an engaging protrusion unit arranged so as to protrude from the garnish body. In order to attach the garnish to the frame unit, the engaging protrusion unit is configured such that said unit, in a state inserted in the insertion hole, engages with an engaging claw provided on the clip.

10 Claims, 4 Drawing Sheets

(56) References Cited

U.S. PATENT DOCUMENTS

| | | | |
|---|---|---|---|
| 6,565,116 B1 * | 5/2003 | Tajima et al. | 280/730.2 |
| 6,811,194 B1 * | 11/2004 | Gaertner et al. | 296/1.08 |
| 7,168,757 B2 * | 1/2007 | Futatsuhashi | 296/209 |
| 7,246,817 B2 * | 7/2007 | Tanase | 280/730.2 |
| 7,325,824 B2 * | 2/2008 | Totani et al. | 280/728.2 |
| 7,344,181 B2 * | 3/2008 | Koshimichi | 296/146.9 |
| 7,344,185 B2 * | 3/2008 | Wright | 296/187.05 |
| 7,707,777 B2 * | 5/2010 | Takeuchi et al. | 49/502 |
| 8,151,521 B2 * | 4/2012 | Iwabuchi | 49/502 |
| 2007/0187988 A1 | 8/2007 | Koshimichi et al. | |
| 2011/0099912 A1 * | 5/2011 | Ohtake et al. | 49/502 |
| 2012/0286115 A1 * | 11/2012 | Hirano et al. | 248/221.11 |

FOREIGN PATENT DOCUMENTS

| | | |
|---|---|---|
| JP | 2002-79890 | 3/2002 |
| JP | 2007-216827 | 8/2007 |
| JP | 2008-254694 | 10/2008 |
| JP | 4373245 | 11/2009 |

\* cited by examiner

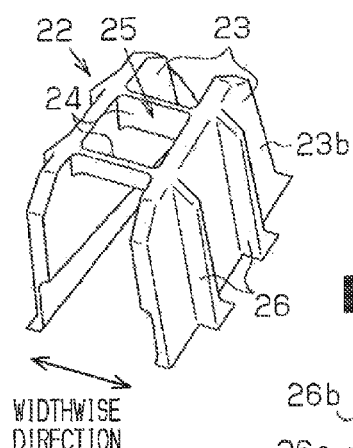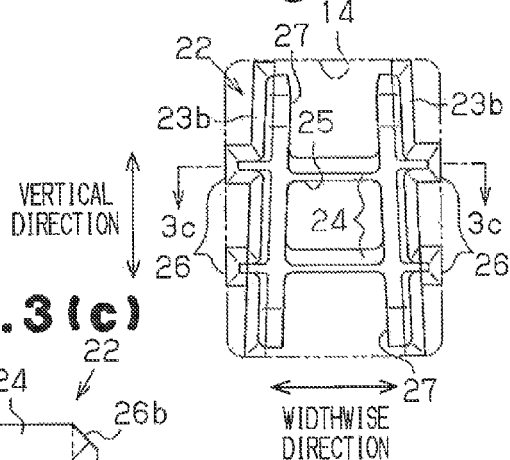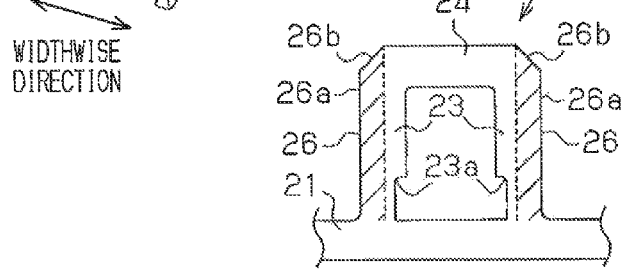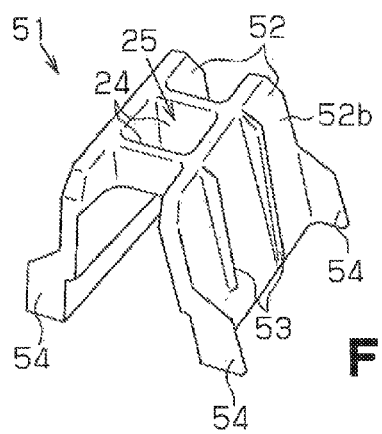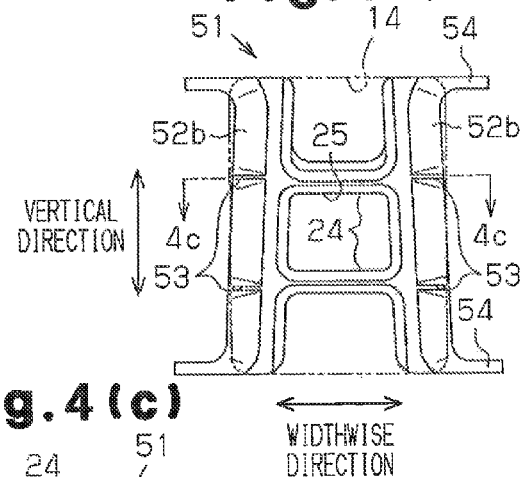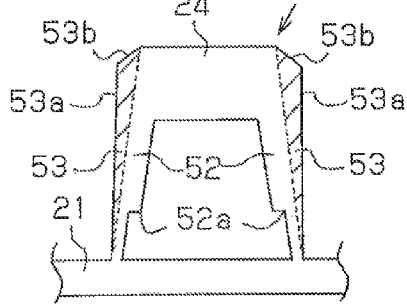

GARNISH AND MOUNTING STRUCTURE

CROSS-REFERENCE TO RELATED APPLICATIONS

This application is a national phase application of International Application No. PCT/JP2011/062110, filed May 26, 2011, and claims the priority of Japanese Application No. 2010-129309, filed Jun. 4, 2010, the content of both of which is incorporated herein by reference.

The present invention relates to a garnish and a coupling structure.

BACKGROUND OF THE INVENTION

A door frame that forms a window frame of a vehicle door includes a frame portion, which serves as a framework of the door frame, and a weather strip, which is secured to the frame portion. The weather strip seals the space between the frame portion and a vehicle body.

Patent document 1 describes a door frame, as shown in FIG. 5, including a frame portion 90 formed by joining an inner sash 91 and an outer sash 92. The inner sash 91 includes a base-like coupling portion 93, and a coupling hole 93a extends through the coupling portion 93. A weather strip 96 includes a coupling hole 97 facing toward the coupling hole 93a. An engagement portion 99a of a clip 99 is inserted through the coupling hole 97 of the weather strip 96 and the coupling hole 93a to fasten the frame portion 90 and the weather strip 96.

Further, in the prior art, as shown in FIGS. 6(a) to 6(c), a door frame that joins a resin garnish 100, in lieu of the outer sash 92, to the inner sash 91 (frame portion) has been proposed. The resin garnish 100 forms a design surface at the outer side of the vehicle. A dedicated clip 101 secured to the garnish 100 is inserted into a coupling hole 102, which is formed in the coupling portion 93 separately from the coupling hole 93a, to fasten the garnish 100 and the inner sash 91.

However, in this case, the clip 101 becomes necessary in addition to the clip 99. This increases the number of components. Further, as shown in FIG. 6(c), the inner sash 91 is recessed from the outer side of the vehicle by an amount corresponding to the projection length of the coupling portion 93, and the clip 101 is fixed to a garnish box 103, which projects from the garnish 100 toward the inner side of the vehicle facing the coupling portion 93. When, for example, load is applied from the outer side of the vehicle to the garnish 100, the garnish box 103 may be broken due to interference with the inner sash 91. Accordingly, the minimum thickness of the garnish box 103 and the garnish 100 has to be determined to ensure that the garnish box 103 has sufficient strength. This reduces the freedom of design.

Referring to FIG. 7, patent document 2 describes a door frame that employs an aluminum inner sash 110 (frame portion) to reduce the weight. In this case, since the bending characteristics of aluminum is generally poor, the base-like coupling portion, which may be a bent portion, is omitted from the inner sash 110. In other words, the resin garnish 116 and the inner sash 110 are joined without using a base-like coupling portion as the inner sash 110.

More specifically, the inner sash 110 includes a flat portion, which is free from bent parts and provided with an insertion hole 111. A garnish 116 includes a coupling projection 117 inserted through the insertion hole 111. A clip 119 is inserted through a coupling hole 122, which extends through the weather strip 120 and an inner insert 121, and inserted into a coupling hole 117a arranged in a front surface of the coupling projection 117 to fasten the inner sash 110 and the weather strip 120. This allows for the fastening of the inner sash 110, the weather strip 120, and the garnish 116 without increasing the number of clips even while keeping the inner sash 110 flat.

PRIOR ART DOCUMENTS

Patent Documents

Patent Document 1: Japanese Laid-Open Patent Publication No. 8-282284
Patent Document 2: Japanese Patent No. 4373245

SUMMARY OF THE INVENTION

For the following two reasons, the door frame of patent document 2 may have an insufficient sealing capability. This may result in water leakage.

(1) The weather strip 120 includes a pressing portion 123 that surrounds the coupling projection 117 (insertion hole 111). To satisfy the sealing capability requirements, the pressing portion 123 is required to be arranged in close contact with the inner sash 110 so that the pressing portion 123 is compressed by a certain amount. Accordingly, a strong force is required to fasten the garnish 116 and the clip 119. However, the resin garnish 116 cannot withstand a strong pressing force. This may deform or break the coupling projection 117. Accordingly, the level of the force for joining the garnish 116 and the clip 119 is limited, and the sealing capacity is insufficient.

To withstand the strong pressing, the rigidity of the garnish 116 may be increased. However, when increasing the rigidity of the garnish 116, the thickness of the garnish 116 must be increased. This increases the projection length toward the outer side of the vehicle and enlarges a step formed between the garnish 116 and the door glass. As a result, the aesthetic appeal is adversely affected. Further, the amount of the used resin material increases, which raises costs.

(2) The inner sash 110 and the weather strip 120 are indirectly pressed against each other through the garnish 116. Thus, for example, coupling variations of the garnish 116 may change the pressing state and result in an insufficient sealing capacity.

It is an object of the present invention to provide a coupling structure that ensures the level of the force fastening a weather strip and a frame portion required to increase the sealing capacity without increasing the number of components, while suppressing the force fastening a garnish and the frame portion and allowing for the coupling of the weather strip and garnish to the frame portion.

To achieve the above object, one aspect of the present invention provides a resin garnish coupled to a door frame that forms a window frame of a vehicle door. The door frame includes a frame portion, which includes a coupling part having an insertion hole, and a weather strip, which is fastened to the frame portion by a clip. The clip is inserted into the weather strip and the insertion hole and hooked to the frame portion to fasten the weather strip to the frame portion. The garnish includes a garnish main body, which forms a design surface at an outer side of a vehicle, and a hooking projection, which projects from the garnish main body. The hooking projection is formed to be engaged with a hook arranged on the clip in a state inserted in the insertion hole to couple the garnish to the frame portion.

A further aspect of the present invention provides a coupling structure that couples a weather strip and a resin garnish to a frame portion. The frame portion forms a framework of a door frame forming a window frame of a vehicle door and includes a coupling part having an insertion hole. The weather strip is coupled to the frame portion and includes a coupling hole opposed to the insertion hole. The resin garnish includes a garnish main body, which forms a design surface at an outer side of a vehicle, and a hooking projection, which projects from the garnish main body and is inserted into the insertion hole. The coupling structure further includes a clip. The clip is inserted into the coupling hole and the insertion hole and hooked to the frame portion to fasten the weather strip to the frame portion. The clip includes a hook engaged with the hooking projection that is inserted into insertion hole to fasten the frame portion to the garnish.

BRIEF DESCRIPTION OF THE DRAWINGS

FIGS. 3(a) and 3(b) are a perspective view and a side view showing a hooking projection of a garnish in the coupling structure of FIG. 1, and FIG. 3(c) is a cross-sectional view taken along line 3c-3c in FIG. 3(b).

FIGS. 4(a) and 4(b) are a perspective view and a side view showing a hooking projection of a garnish according to a modified embodiment of the present invention, and FIG. 4(c) is a cross-sectional view taken along line 4c-4c in FIG. 4(b).

DETAILED DESCRIPTION OF THE PREFERRED EMBODIMENTS

One embodiment of the present invention will now be described with reference to the drawings.

Figure 1:
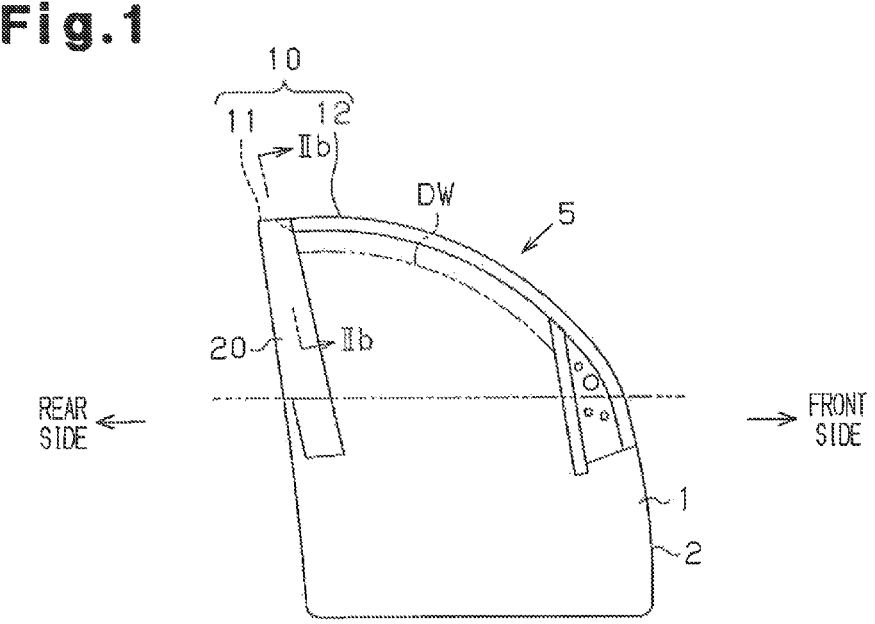
FIG. 1 is a side view showing a vehicle door to which a coupling structure according to one embodiment of the present invention is applied.

FIG. 1 is a side view showing a vehicle door to which a coupling structure of the present embodiment is applied from an outer side in a widthwise direction of a vehicle (outer side of vehicle). As shown in the drawing, a vehicle door 1 supported at the side of a vehicle body (not shown) includes a lower part that defines a door main body 2. The door main body 2, which is formed by joining an outer door panel and an inner door panel (not shown), is a bag-shaped structure having an upper opening. The vehicle door 1 further includes a door window glass DW or the like that projects from and retracts into the upper opening.

Further, the vehicle door 1 includes a door frame 5, which is fixed to a top part of the door main body 2 and which forms a window frame of the vehicle door (i.e., frame of door window glass DW). The door frame 5 includes a frame portion 10 that forms the framework of the door frame 5. The frame portion 10 includes a pillar portion 11, which is located toward the rear of the vehicle, and an upper rim portion 12, which is located toward the front of the vehicle. The pillar portion 11, which extends in the heightwise direction of the vehicle, is fixed to the door main body 2 (e.g., inner door panel). The upper rim portion 12 is connected to the top end of the pillar portion 11. The upper rim portion 12 extends to have a generally arch-shaped form. The vehicle door 1 of the present embodiment is a front door, and the upper rim portion 12 and pillar portion 11 of the frame portion 10 (door frame 5) are respectively arranged in correspondence with an A pillar and B pillar (center pillar) of the vehicle body. An elongated garnish 20, which is molded from, for example, a resin material of acrylonitrile butadiene styrene (ABS) or the like is secured to the pillar portion 11. The garnish 20 covers the pillar portion 11 from the outer side of the vehicle.

Figure 2A:
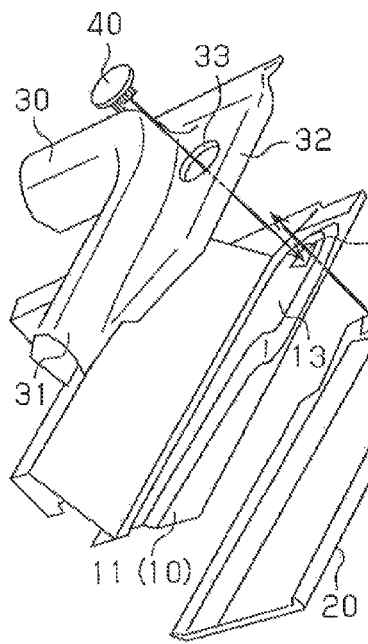
FIGS. 2(a) and 2(b) are an exploded perspective view showing the coupling structure of FIG. 1 and a cross-sectional view taken along line IIb-IIb in FIG. 1.
Figure 2B:
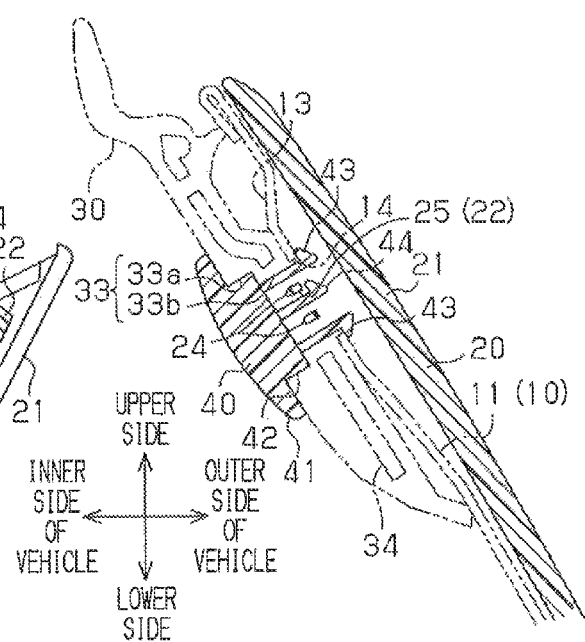
Figure 5:
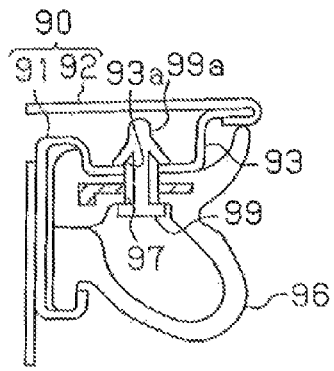
FIG. 5 is a cross-sectional view showing a coupling structure of the prior art.
Figure 6A:
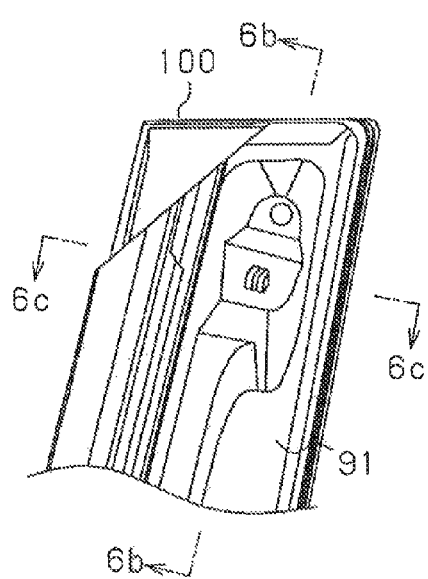
FIG. 6 is a side view showing another coupling structure of the prior art.
FIGS. 6(b) and 6(c) are cross-sectional views respectively taken along lines 6b-6b and 6c-6c in FIG. 6(a).
Figure 6B:
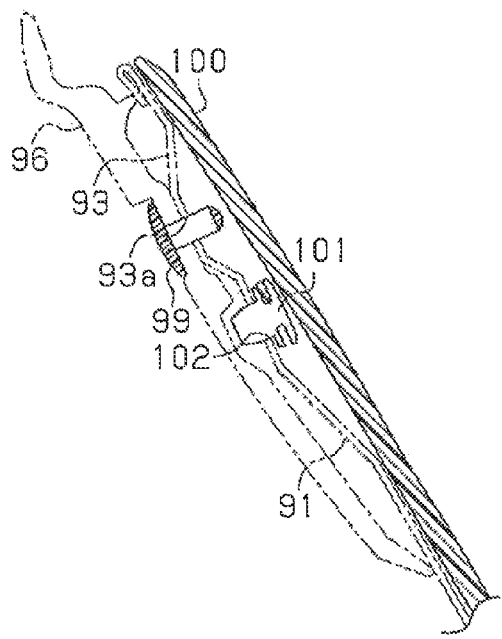
Figure 6C:
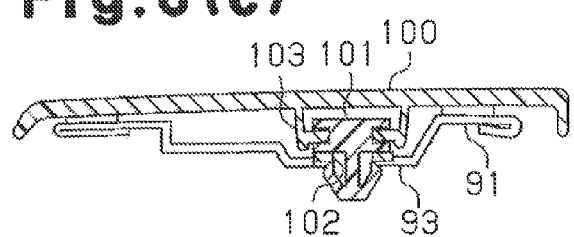
Figure 7:
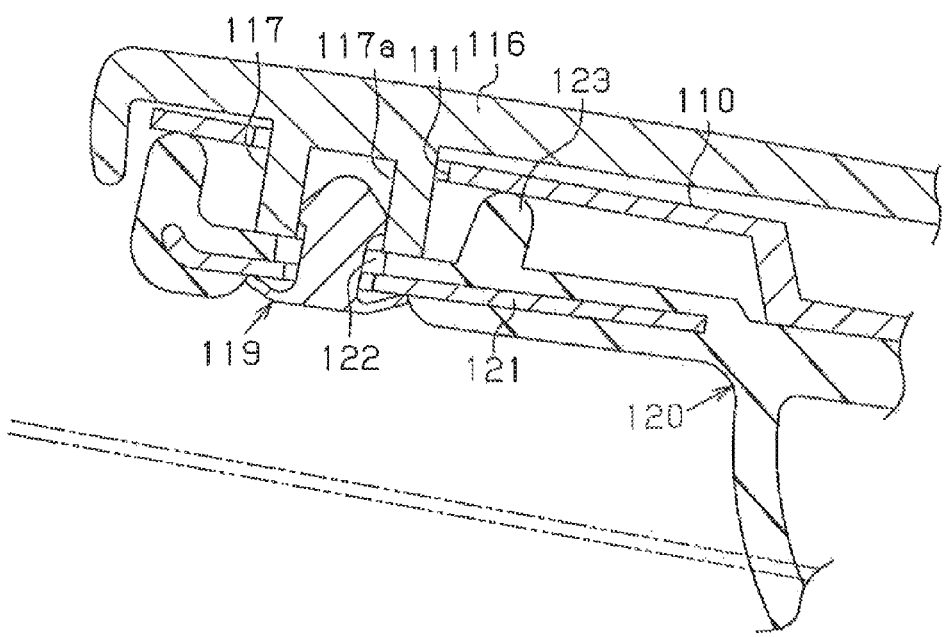
FIG. 7 is a cross-sectional view showing another coupling structure of the prior art.

FIG. 2(a) is an exploded perspective view showing the door frame 5 at the pillar portion 11, and FIG. 2(b) is a cross-sectional view of the door frame 5 taken along line IIb-IIb in FIG. 1. As shown in these drawings, the pillar portion 11 includes a base-like coupling part 13, which is arranged at a top part of the pillar portion 11 to project toward the inner side of the vehicle. The coupling part 13 includes an insertion hole 14, which is generally tetragonal (refer to FIG. 3) and extends through the coupling part 13 in the thicknesswise direction. The pillar portion 11 is formed by, for example, pressing a steel plate.

A weather strip 30, which is secured to the pillar portion 11 (frame portion 10), is, for example, molded from an elastic material of rubber or the like. The weather strip 30 includes a hollow seal 31, which has a generally uniform cross-section and generally extends along the entire length of the frame portion 10, and a planar coupling wall 32, which is formed integrally with the seal 31 in conformance with the top part of the pillar portion 11. When the vehicle door 1 is fully closed, the weather strip 30 seals the space between the frame portion 10 and the vehicle body as the seal 31 elastically contacts the vehicle body generally throughout the entire length of the frame portion 10.

An insert 34 formed by, for example, a metal plate is embedded in the coupling wall 32. The coupling wall 32 includes a coupling hole 33, which faces the insertion hole 14 of the pillar portion 11. The coupling hole 33 has a stepped form and includes a circular attachment hole 33a, which is arranged at the side that is farther from the pillar portion 11, and an insertion hole 33b, which has a smaller diameter than the attachment hole 33a and faces pillar portion 11 (insertion hole 14).

The garnish 20 includes an elongated garnish main body 21, which forms a design surface at the outer side of the vehicle, and a hooking projection 22, which projects integrally from the garnish main body 21 facing the insertion hole 14 of the pillar portion 11. When securing the garnish 20 to the pillar portion 11, the hooking projection 22 is inserted into the insertion hole 14.

As shown in FIGS. 3(a) to 3(c), the hooking projection 22 includes two generally planar support walls 23, which extend from the garnish main body 21 spaced apart in a widthwise direction of the garnish main body 21 (corresponding to front to rear direction of the vehicle), and two connecting walls 24, which connect distal ends of the two support walls 23. The support walls 23 and the connecting walls 24 form a generally tetragonal frame that defines a hooking hole 25 at a distal part of the hooking projection 22. When the hooking projection 22 (two support walls 23) is inserted into the insertion hole 14, the hooking hole 25 is arranged on the pillar portion 11 at the opposite side of the garnish main body 21 (refer to FIG. 2(b)). The hooking hole 25 opens in the same direction as the insertion hole 14 at a central part of the insertion hole 14 (refer to FIG. 3(b)). The parts of the insertion hole 14 at the upper side and lower side of the hooking hole 25 form openings 27 defined by the support walls 23 and the connecting walls 24.

Generally, to prevent sink marks during resin molding, the minimum thickness of the garnish main body 21 is required to be determined in accordance with the thickness of the support walls 23. In the present embodiment, a step 23a (refer to FIG. 3(c)) is arranged at the basal side (toward garnish main body 21) of each support wall 23 so that the width at the basal side of the support wall 23 is smaller than the width at the distal side. This reduces the limitation on the minimum thickness of the garnish main body 21 and eliminates the need to increase the thickness of the garnish main body 21. Further, the support walls 23 include outer surfaces 23b (surfaces of the two support walls 23 facing opposite directions), each provided with two streaks of ribs 26, which function as a first rib and a second rib and which are located at positions conforming to the connecting walls 24 as viewed from beside (refer to FIG. 3(b)). In this manner, the two ribs 26 are formed on each of the two support walls 23 intersecting the outer surface 23b of the support wall 23 at a generally right angle (widthwise direction of the garnish main body 21) and projects away from the other one of the support walls 23. Each rib 26 is connected to the support wall 23 and the garnish main body 21 and reinforces the part of the support wall 23 connected to the garnish main body 21. Further, each rib 26 extends in the extending direction of the support wall 23 and reinforces the outer surface 23b of the support wall 23.

Each rib 26 has a generally constant projection length generally throughout the entire length in the extending direction of the support wall 23. The distance between outer surfaces 26a of the ribs 26 opposed in the opposing direction (widthwise direction of the garnish main body 21) of the two support walls 23 is constant in a range covering at least part of the support walls 23 in the extending direction. The constant distance between the outer surfaces 26a is generally the same as the opening width of the insertion hole 14 in the widthwise direction (refer to FIG. 3(b)). Thus, even when manufacturing dimension variations or coupling variations change the insertion position of the support walls 23 (hooking projection 22) relative to the insertion hole 14 within the range in the extending direction of the support walls 23, the positioning accuracy of the hooking projection 22 relative to the insertion hole 14 can be kept at a generally constant and high level.

A distal part of the rib 26, which is farthest from the garnish main body 21, is diagonally cut. This forms a guide 26b that guides the insertion of the hooking projection 22 into the insertion hole 14.

As shown in FIGS. 2(a) and 2(b), a clip 40, which is inserted through the coupling hole 33 of the weather strip 30, is engaged with the pillar portion 11 and the garnish 20. The clip 40 is formed from an elastic resin material such as polypropylene (PP) or polyacetal (POM). The clip 40 includes a generally disk-shaped head portion 41, which has a larger outer diameter than the inner diameter of the attachment hole 33a, and a generally cylindrical attachment portion 42, which has generally the same outer diameter as the inner diameter of the attachment hole 33a. The clip 40 further includes two frame portion hooks 43 projecting from an upper part and lower part of the attachment portion 42 toward the garnish main body 21. The frame portion hooks 43 are respectively inserted into the openings 27 defined at the upper side and lower side of the hooking hole 25. When the attachment portion 42 is attached to the attachment hole 33a in the coupling hole 33, the distal ends of the two frame portion hooks 43 are inserted through the insertion hole 33b and the insertion hole 14 (openings 27) and hooked to the rim of the insertion hole 14. This engages the clip 40 with the pillar portion 11. In this state, the clip 40 sandwiches the weather strip 30 and the pillar portion 11 between the head portion 41 and the distal ends of the two frame portion hooks 43 thereby fastening the weather strip 30 and the pillar portion 11. The fastening force between the weather strip 30 and the pillar portion 11 is set at a level that is sufficient for maintaining the sealing capability at the pressed contact surface between the weather strip 30 and the pillar portion 11.

Further, the clip 40 includes a garnish hook 44 projecting from a central part of the attachment portion 42 and inserted into the hooking hole 25. When the attachment portion 42 is attached to the attachment hole 33a of the coupling hole 33, the distal end of the garnish hook 44 is hooked to the rim of the hooking hole 25 (upper connecting wall 24 in FIG. 2(b)). This engages the clip 40 with the garnish 20. In this state, the clip 40 pulls the connecting walls 24 (hooking projection 22) toward the weather strip 30 thereby fastening the pillar portion 11 and the garnish 20. The fastening force between the pillar portion 11 and the garnish 20 is, for example, suppressed at the minimum level required to prevent separation of the garnish 20. The fastening force (binding force) between the pillar portion 11 and the garnish 20 is complemented by the adhesive force of a double-sided tape (not shown) applied between the pillar portion 11 and the garnish 20. Further, the adhesion of the pillar portion 11 and the garnish 20 with the double-sided tape prevents swaying about the insertion hole 14 (hooking projection 22).

The present embodiment has the advantages described below.

(1) In the present embodiment, the garnish hook 44 is hooked to the hooking projection 22 inserted into the insertion hole 14. As a result, the garnish 20 is engaged with the clip 40, pulled by the clip 40, and fastened to the pillar portion 11 (frame portion 10). In this manner, the garnish 20 and the pillar portion 11 are fastened using the clip 40, which fastens the weather strip 30 and the pillar portion 11. This allows for the number of components to be decreased and thereby reduces costs. Further, the fastening force (pulling force) related with the sealing capability produced between the weather strip 30 and the pillar portion 11 by the clip 40 is set independently from the fastening force produced between the garnish 20 and the pillar portion 11 by the clip 40. Thus, for example, the fastening force between the pillar portion 11 and the weather strip 30 can be sufficiently ensured to improve the sealing capability without increasing the fastening force between the garnish 20 and the pillar portion 11. Further, the fastening force (pulling force) between the garnish 20 and the pillar portion 11 can be suppressed to, for example, the minimum level that prevents separation of the garnish 20 without decreasing the fastening force between the weather strip 30 and the pillar portion 11. This allows for the rigidity of the hooking projection 22 to be lowered thereby allowing for a further decrease in the thickness of the hooking projection 22 and the garnish main body 21.

(2) In the present embodiment, the two support walls 23 are each reinforced by the ribs 26. This allows for a further decrease in the thickness of the support walls 23.

(3) In the present embodiment, the ribs 26 (first rib) reinforce the part of the support walls 23 connected to the garnish main body 21. This prevents the support wall 23 from leaning without increasing the thickness. Further, the ribs 26 (second rib) reinforce the outer surfaces 23b of the support walls 23. This prevents deformation of the support walls 23.

(4) In the present embodiment, the ribs 26 (first rib) that reinforce the part of the support walls 23 connected to the garnish main body 21 also function as the ribs 26 (second rib) that reinforce the outer surfaces 23b of the support walls 23. In other words, the first rib is integrated with the second rib. This simplifies the shape of the hooking projection 22 (support walls 23) in comparison to, for example, when arranging separate first and second ribs on each support wall 23.

(5) In the present embodiment, the distance between the outer surfaces 26a of the opposing ribs 26 is constant in a range covering at least part of the support walls 23 in the extending direction. Accordingly, even when manufacturing dimension variations or coupling variations change the insertion position of the support walls 23 (hooking projection 22) relative to the insertion hole 14 within the range in the extending direction of the support walls 23, the positioning accuracy of the hooking projection 22 relative to the insertion hole 14 can be kept at a generally constant level.

(6) In the present embodiment, the guides 26b of the ribs 26 guide the insertion of the hooking projection 22 into the insertion hole 14. This allows for smooth insertion of the hooking projection 22 into the insertion hole 14. In particular, even when the positioning accuracy of the insertion hole 14 and the hooking projection 22 is kept at a high level so that the opening width of the insertion hole 14 is set to be generally the same as the distance between the outer surfaces 26a of the opposing ribs 26 and play between the wall of the insertion hole 14 and the hooking projection 22 is subtle or null, the hooking projection 22 can be smoothly inserted into the insertion hole 14.

(7) The present embodiment omits the clip dedicated for fastening the garnish 20 and the pillar portion 11. Thus, there is no need to cover a clip with the coupling wall 32 of the weather strip 30, and the coupling wall 32 (corner in the weather strip 30) can be further reduced in size.

(8) In the present embodiment, the pillar portion 11 is fastened to the weather strip 30 in the proximity of the insert 34. This further stabilizes the sealing capability.

(9) In the present embodiment, by decreasing the thickness of the garnish main body 21, the step formed with the door window glass DW can be reduced in size. This prevents the aesthetic appeal from being adversely affected by the step and suppresses wind roar.

The above embodiment may be modified as described below.

FIGS. 4(a) to 4(c) show a hooking projection 51 that can be employed. Specifically, the hooking projection 51 includes two support walls 52 inclined relative to the garnish main body 21 to become closer to each other toward their distal ends (refer to FIG. 4(c)). Further, each support wall 52 includes a step 52a at a part near its basal end (part near garnish main body 21), and the part near the basal end of the support wall 52 has a smaller width than other parts. Additionally, the support walls 52 include outer surfaces 52b (surfaces of the two support walls 23 facing opposite directions), each provided with streaks of second ribs 53, which are located at positions corresponding to the connecting walls 24 as viewed from beside (refer to FIG. 4(b)). In this manner, the second ribs 53 are formed on each of the two support walls 52 in a direction intersecting the outer surface 52b of the support wall 52 at a generally right angle (widthwise direction of the garnish main body 21) and projects away from the other one of the support walls 52. Each second rib 53 extends in the extending direction of the support wall 52 and reinforces the outer surface 52b of the support wall 52.

Further, each second rib 53 is formed so that the projection length of the second rib 53 gradually increases from the basal side to the distal side of the support wall 52. In the projection direction, each second rib 53 includes an outer surface 53a that extends in a direction orthogonal to the garnish main body 21. Accordingly, the distance between the outer surfaces 53a of the second ribs 53 opposed in the opposing direction (widthwise direction of the garnish main body 21) of the two support walls 52 is constant in a range covering at least part of the support walls 52 in the extending direction. The constant distance between the outer surfaces 53a is generally the same as the opening width of the insertion hole 14 in the widthwise direction (refer to FIG. 4(b)). Thus, even when manufacturing dimension variations or coupling variations change the insertion position of the support walls 52 (hooking projection 51) relative to the insertion hole 14 in the extending direction of the support walls 52 within the range, the positioning accuracy of the hooking projection 51 relative to the insertion hole 14 can be kept at a generally constant and high level. In this case, the width at the basal end of each support wall 52 does not increase even at where the second ribs 53 are located. Accordingly, even when the second ribs 53 are molded, the formation of sink marks is suppressed at the basal end of each support wall 52 where the second rib 53 are located. This allows for the garnish main body 21 to remain thin even at where the second ribs 53 are located. A distal part of the second rib 53, which is farthest from the garnish main body 21, is diagonally cut. This forms a guide 53b that guides the insertion of the hooking projection 51 into the insertion hole 14.

Further, each support wall 52 includes two planar first ribs 54 formed at parts connected to the garnish main body 21. The first ribs 54 of each support wall 52 project in directions opposite to the first ribs 54 of the other support wall 52. Specifically, the two first ribs 54 formed on each of the two support walls 52 project away from the first ribs 54 of the other support wall 52 in a direction intersecting the outer surface 52b of the support wall 52 at a generally right angle. The first ribs 54 are formed at the top end and bottom end of each support wall 52. Each first rib 54 reinforces the part of the support wall 52 connected to the garnish main body 21. This prevents the two support wall 52 from leaning without increasing the thickness. In addition, the first ribs 54 gradually increase the connection area of the garnish main body 21 and the hooking projection 51, and the shape of the part connecting each support wall 52 and the garnish main body 21 becomes two-dimensional. As a result, the tensile strength between each support wall 52 and the garnish main body 21 can be increased. In this case, there is no need to increase the thickness of each support wall 52. Thus, for example, there is no need to increase the thickness of the garnish main body 21 to prevent sink marks, and the garnish main body 21 can be further reduced in thickness.

The modified embodiment has advantages (1) to (3) and (5) to (9) of the above embodiment. In particular, the first and second ribs 54 and 53 are arranged separately on each support wall 52. This reduces limitations on the shape of the second ribs 53 caused by the first ribs 54. Thus, the projection length of the second ribs 53 can be set to be subtle or null at the parts of the support walls 52 connected to the garnish main body 21. Thus, even when using the second ribs 53, there is no need to increase the thickness of the support walls 52 at the connecting parts, and the formation of sink marks during resin molding can be suppressed.

In the above embodiments, the guides that guide the hooking projections 22 and 51 to the insertion hole 14 are formed in the ribs 26 and 53. Instead or in addition, the guides may be formed on the support walls 23 and 52.

In the above embodiment, the number and arrangement of the first ribs 54 on each support wall 52 are just examples. Further, the first ribs 54 formed on each of the two support walls 52 only need to be projected in a direction intersecting the outer surface 52b of the support wall and, for example, may be projected toward the other support wall 52.

In the above embodiments, the shape of the clip 40 is just one example. For example, the number of the frame portion hooks 43 used to fasten the pillar portion 11 and the weather strip 30 may be one, three, or more. Further, the distal end of the garnish hook 44 used to fasten the pillar portion 11 and the garnish 20 may be hooked to the lower connecting wall 24 instead of or in addition to the upper connecting wall 24.

In the above embodiment, the insertion hole 14 of the pillar portion 11 and the hooking projections 22 and 51 inserted into the insertion hole 14 are arranged at the top part of the pillar portion 11 and the like (corner of door frame 5). Instead or in addition, a hooking projection may be arranged at a bottom part of the pillar portion 11 or the like.

In the above embodiment, the garnish 20 is attached to the pillar portion 11 of the frame portion 10. However, the present invention may also be applied to a garnish that is attached to the upper rim portion 12.

The present invention may be applied to, for example, a door frame of a rear door.

The invention claimed is:

1. A resin garnish coupled to a door frame that forms a window frame of a vehicle door, wherein the door frame includes a frame portion, which includes a coupling part having an insertion hole, and a weather strip, which is fastened to the frame portion by a clip, and the clip is inserted into the weather strip and the insertion hole and hooked to the frame portion to fasten the weather strip to the frame portion, the garnish comprising:
   a garnish main body that forms a design surface at an outer side of a vehicle; and
   a hooking projection that projects from the garnish main body,
   wherein the hooking projection is formed to be engaged with a hook arranged on the clip in a state inserted in the insertion hole to couple the garnish to the frame portion.

2. The garnish according to claim 1, wherein
   the hooking projection includes two support walls extending from the garnish main body and inserted into the insertion hole, and
   each of the support walls includes a reinforcement rib.

3. The garnish according to claim 2, wherein the reinforcement rib projects in a direction intersecting an outer surface of the corresponding support wall.

4. The garnish according to claim 3, wherein the reinforcement rib includes
   a first rib that is connected to the corresponding support wall and the garnish main body and reinforces a part of the support wall connected to the garnish main body, and
   a second rib that extends in an extending direction of the corresponding support wall and reinforces the outer surface.

5. The garnish according to claim 4, wherein the first and second ribs are separately arranged on the corresponding support wall.

6. The garnish according to claim 4, wherein the first rib is used as the second rib.

7. The garnish according to claim 2, wherein the reinforcement rib projects from an outer surface of the corresponding support wall, and the distance between the outer surfaces of opposing ones of the reinforcement ribs on the two support walls is constant in a range of at least part of the support walls in the extending direction.

8. The garnish according to claim 2, wherein the hooking projection includes a guide that guides the insertion of the hooking projection into the insertion hole.

9. The garnish according to claim 8, wherein the guide is formed on at least either one of the support walls and the reinforcement rib.

10. A coupling structure comprising:
    the garnish according to claim 1;
    the frame portion;
    the weather strip; and
    the clip.

* * * * *